(12) United States Patent
Sugiyama et al.

(10) Patent No.: US 9,414,436 B2
(45) Date of Patent: *Aug. 9, 2016

(54) RADIO COMMUNICATION APPARATUS, RADIO COMMUNICATION SYSTEM AND RADIO COMMUNICATION METHOD

(71) Applicant: Fujitsu Limited, Kawasaki-shi, Kanagawa (JP)

(72) Inventors: Jun Sugiyama, Kawasaki (JP); Shuya Hirata, Kawasaki (JP); Tomohiko Choraku, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,731

(22) Filed: Sep. 3, 2013

(65) Prior Publication Data

US 2014/0003351 A1   Jan. 2, 2014

Related U.S. Application Data

(60) Division of application No. 12/621,968, filed on Nov. 19, 2009, now abandoned, which is a continuation of application No. PCT/JP2007/000565, filed on May 25, 2007.

(51) Int. Cl.
| | |
|---|---|
| *H04W 84/18* | (2009.01) |
| *H04W 88/06* | (2009.01) |
| *H04B 1/403* | (2015.01) |
| *H04W 4/18* | (2009.01) |
| *H04W 92/20* | (2009.01) |

(52) U.S. Cl.
CPC .............. *H04W 88/06* (2013.01); *H04B 1/406* (2013.01); *H04W 4/18* (2013.01); *H04W 92/20* (2013.01)

(58) Field of Classification Search
None
See application file for complete search history.

(56) References Cited

U.S. PATENT DOCUMENTS

| | | |
|---|---|---|
| 6,643,524 B1 | 11/2003 | Ishii et al. |
| 2001/0043625 A1 | 11/2001 | Shinozaki |
| 2004/0062214 A1 | 4/2004 | Schnack et al. |
| 2004/0077345 A1* | 4/2004 | Turner et al. ................... 455/423 |
| 2005/0105534 A1* | 5/2005 | Osterling ................. 370/395.43 |
| 2005/0152695 A1 | 7/2005 | Sulzberger et al. |

(Continued)

FOREIGN PATENT DOCUMENTS

| | | |
|---|---|---|
| CN | 1874553 A | 12/2006 |
| JP | 07231469 | 8/1995 |

(Continued)

OTHER PUBLICATIONS

3rd Notification of Office Action dated Aug. 7, 2013 received in Chinese Application No. 200780053116.X.

(Continued)

*Primary Examiner* — Hassan Phillips
*Assistant Examiner* — Gautam Sharma
(74) *Attorney, Agent, or Firm* — Smith, Gambrell & Russell, LLP

(57) ABSTRACT

A radio communication apparatus for performing radio communication, including: a first interface conversion unit which extracts a first signal and a second signal multiplexed and input, and corresponding to two different formats, and combines the extracted first and second signal; and a common amplifier which is shared by the first and second signal by amplifying the combined first and second signal, wherein a signal output from the common amplifier is transmitted.

6 Claims, 14 Drawing Sheets

(56) References Cited

U.S. PATENT DOCUMENTS

| | | | |
|---|---|---|---|
| 2005/0192014 A1 | 9/2005 | Hacena et al. |
| 2005/0286507 A1 | 12/2005 | Osterling et al. |
| 2006/0088125 A1 | 4/2006 | Miyatani et al. |
| 2007/0091896 A1 | 4/2007 | Liu |
| 2007/0116046 A1 | 5/2007 | Liu et al. |
| 2007/0147488 A1 | 6/2007 | Han |
| 2007/0184876 A1 | 8/2007 | Splett |
| 2007/0195815 A1 | 8/2007 | Turner et al. |
| 2007/0270185 A1 | 11/2007 | Yagawa |
| 2008/0045254 A1 | 2/2008 | Gupta et al. |
| 2008/0316102 A1 | 12/2008 | Splett |
| 2010/0087227 A1 | 4/2010 | Francos et al. |
| 2010/0118751 A1 | 5/2010 | Sugiyama et al. |
| 2010/0291955 A1 | 11/2010 | Sattele |
| 2011/0286540 A1 | 11/2011 | Jiang et al. |

FOREIGN PATENT DOCUMENTS

| | | |
|---|---|---|
| JP | 2001333108 | 11/2001 |
| JP | 2004147009 | 5/2004 |
| JP | 2007124608 | 5/2007 |
| JP | 2007124608 A | 5/2007 |
| WO | 2008120297 | 10/2008 |

OTHER PUBLICATIONS

Final Office Action dated Nov. 1, 2013 received in U.S. Appl. No. 12/621,968.
Non-final Office Action dated Feb. 29, 2012 received in U.S. Appl. No. 12/621,968.
Non-final Office Action dated Aug. 15, 2012 received in U.S. Appl. No. 12/621,968.
Non-final Office Action dated May 22, 2013 received in U.S. Appl. No. 12/621,968.
Final Office Action dated Jan. 14, 2013 received in U.S. Appl. No. 12/621,968.
CPRI Specification V2.1 dated (Mar. 31, 2006) Common Public Radio Interface (CPRI); Interface Specification.
Korean Notice of Preliminary Rejection dated Apr. 1, 2011 for application No. 10-2009-7024410.
Office Action dated Apr. 24, 2012 issued in corresponding Japanese Patent Application No. 2009-516073.
Chinese Office Action dated Apr. 24, 2012 received in Application No. 200780053116.X.
3rd Notification of Chinese Office Action dated Aug. 7, 2013 received in Application No. 200780053116.X.
Extended European Search Report dated Oct. 22, 2014 received in Application No. 07737221.7.
5th Notification of Chinese Office Action received in Chinese Patent Application No. 200780053116.X dated Sep. 2, 2014.
Non-final Office Action dated Aug. 14, 2014 received in U.S. Appl. No. 14/016,784.
Final Office Action dated Mar. 12, 2015 received in U.S. Appl. No. 14/016,784.
Notice of Allowance dated Dec. 21, 2015 received in U.S. Appl. No. 14/016,784.
Non-final Office Action dated Aug. 5, 2015 received in U.S. Appl. No. 14/016,784.

\* cited by examiner

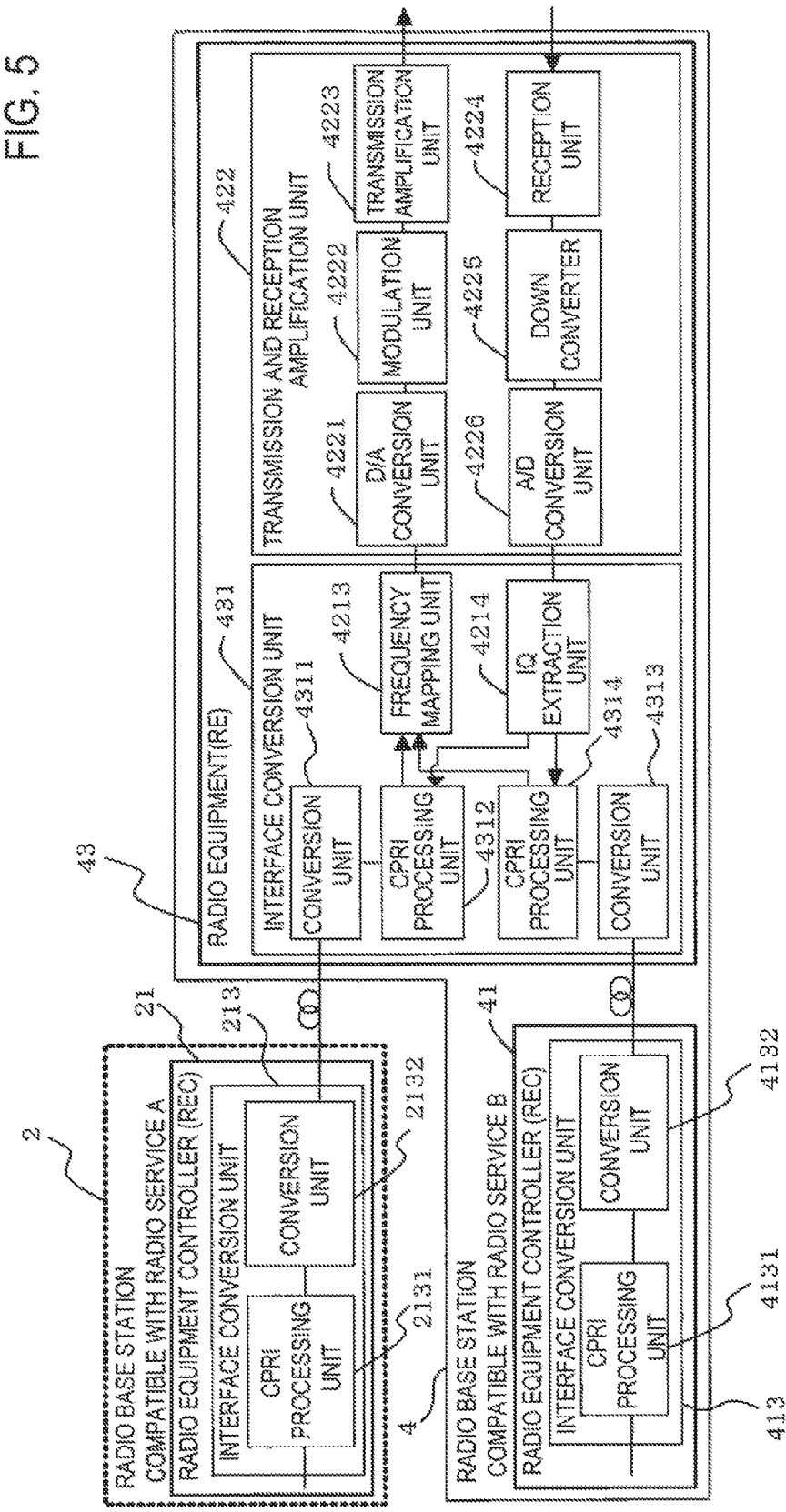

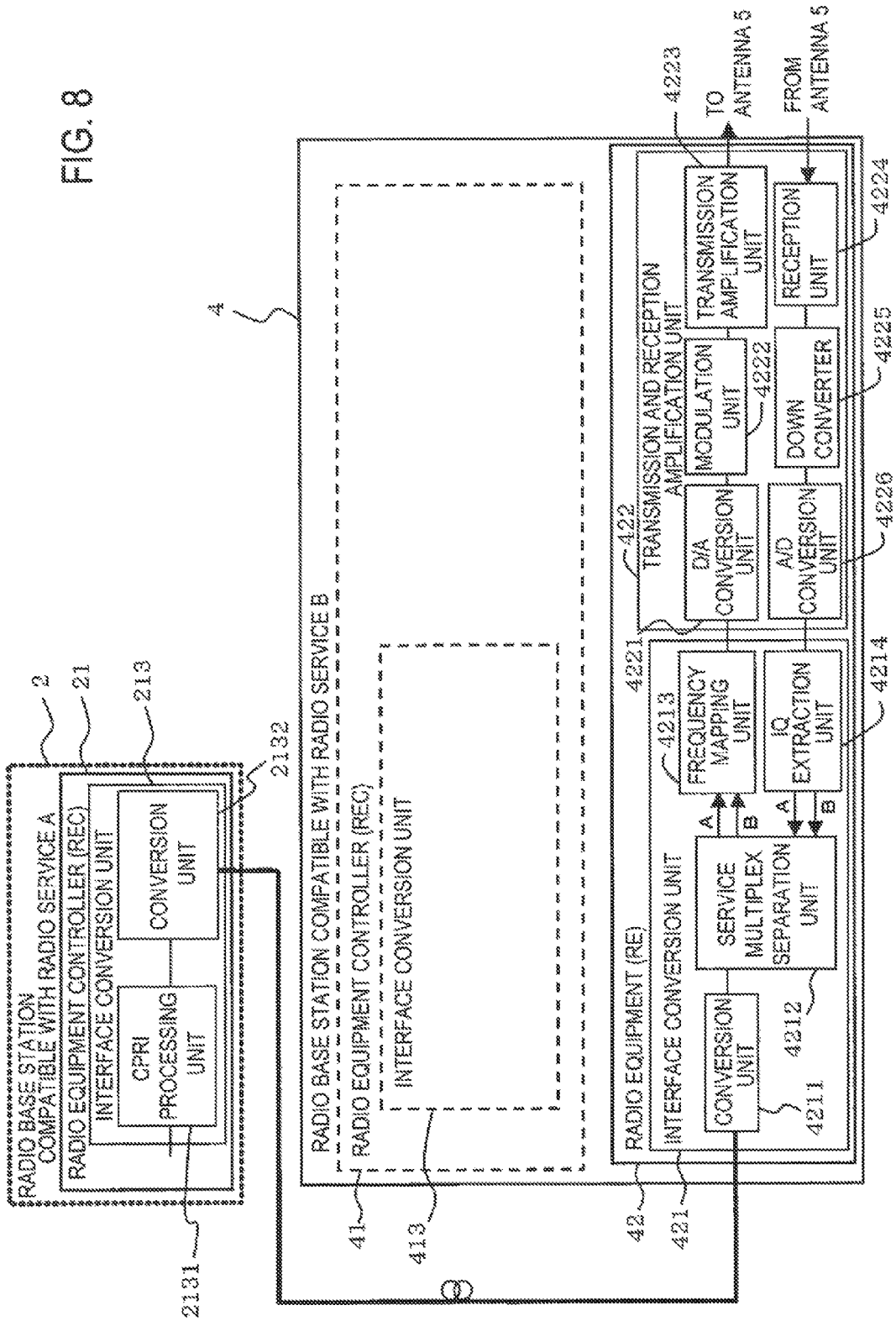

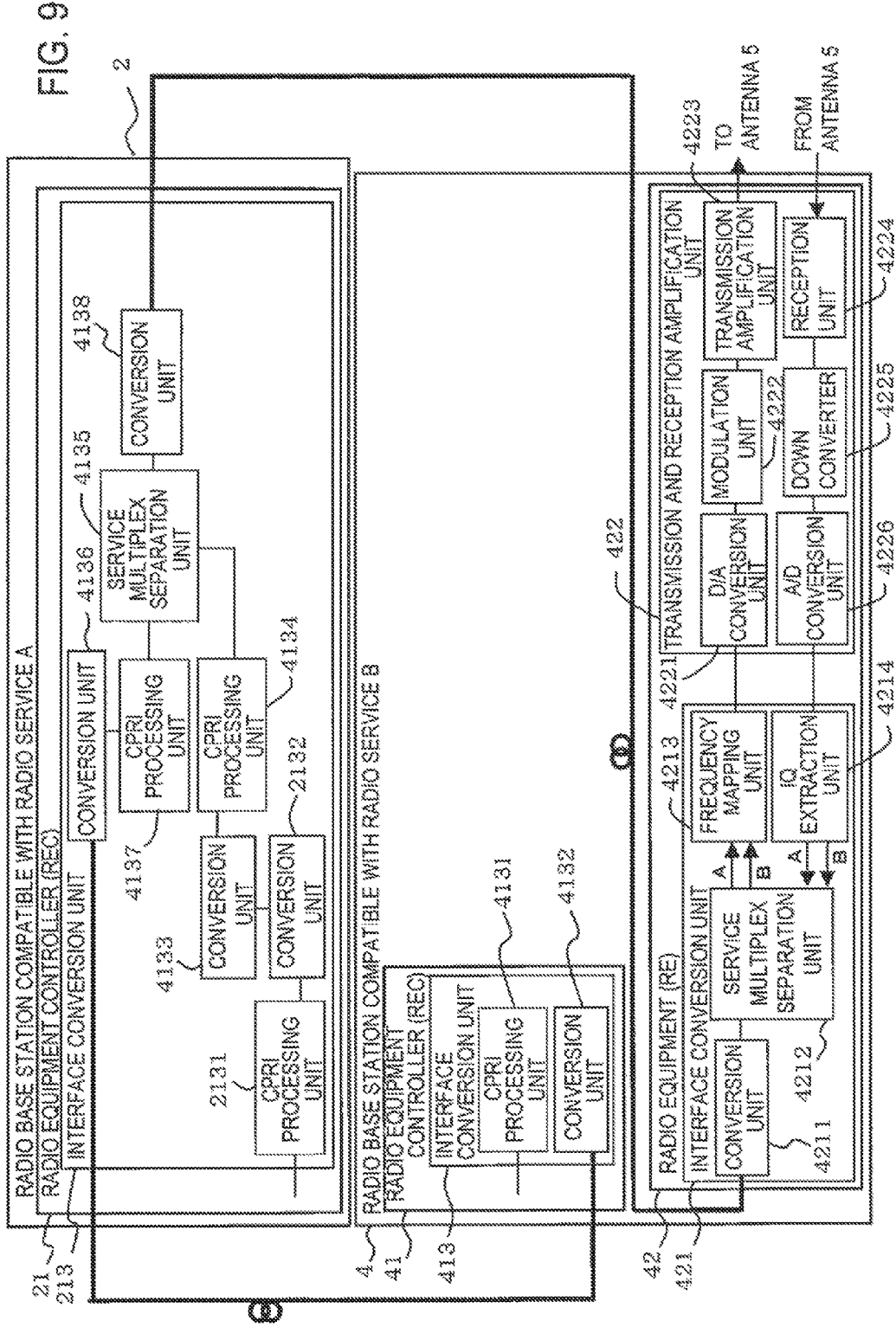

RADIO COMMUNICATION APPARATUS, RADIO COMMUNICATION SYSTEM AND RADIO COMMUNICATION METHOD

CROSS REFERENCE TO RELATED APPLICATIONS

This application is a divisional of U.S. application Ser. No. 12/621,968, filed Nov. 19, 2009, which is a continuation of International Application No. PCT/JP2007/000565, filed on May 25, 2007, now pending, both of which are herein incorporated by reference.

TECHNICAL FIELD

The present invention relates to a radio communication apparatus, a radio communication system and a radio communication method.

BACKGROUND ART

In the field of radio communications, communication systems using new communication formats are being constructed and radio services are being provided accompanying advances in technology. At that time, since normally numerous users do not switch to a new radio service immediately, but rather switch gradually, multiple radio services are implemented in parallel. In addition, when constructing new communication formats, although this involves the introduction of new, dedicated equipment to accommodate those formats, since existing services are still being implemented, it is necessary to secure locations for installing the dedicated equipment that is compatible with the new communication format.

FIG. 10 is a drawing depicting an example of the configuration of a radio base station (BTS) 200 of the prior art (see, for example, Non-Patent Document 1). The radio base station 200 is provided with a radio equipment (RE) 220 which performs out processing on radio signals such as filtering, modulation and frequency conversion, and a radio equipment controller (REC) 210 which performs processing on baseband signals. The radio equipment 220 and the radio equipment controller 210 are connected by an optic fiber in the form of an optical communication cable, and an interface in the form of a common public radio interface (CPRI) is interposed there between.

In addition, the following Patent Document 1 indicates an example of the prior art that uses this type of CPRI for the interface.

Non-Patent Document 1: CPRI Specification V2.1
Patent Document 1: PCT Application Publication No. WO/2008/120297

DISCLOSURE OF THE INVENTION

Problems to be Solved by the Invention

In order to allow a radio base station to switch to a new radio service, it is desirable that the radio base station be able to share both old and new services to enable it to be compatible both services.

In addition, it is possible to consider installing two radio base stations in parallel as depicted in FIG. 10 in order to provide radio base stations capable of being compatible with two old and new services (or two different services).

However, it is necessary to install an optical cable for connecting the radio equipment and the radio equipment controller in order to additionally provide the radio base station.

However, installing the additional optical cable leads to increased costs. Thus, it would be desirable to be able to integrate and transmit two services using an existing optical cable.

Moreover, a radio base station compatible with multiple services would also be desirable.

Therefore, with the foregoing in view, it is an object of the present invention to provide a radio communication apparatus capable of sharing two radio services so as to be able to be compatible with both services, a radio communication system, and a radio communication method.

In addition, it is another object of the present invention to provide a radio communication apparatus and the like capable of providing two services without increasing the number of optical cables.

Moreover, it is another object of the present invention is to provide a radio communication apparatus and the like that is compatible with multiple services.

Means for Solving the Problem

A radio communication apparatus for performing radio communication, including: a first interface conversion unit which extracts a first signal and a second signal multiplexed and input, and corresponding to two different formats, and combines the extracted first and second signal; and a common amplifier which is shared by the first and second signal by amplifying the combined first and second signal, wherein a signal output from the common amplifier is transmitted.

A radio communication system, including: a first radio communication apparatus; and a second radio communication apparatus, wherein the first radio communication apparatus includes a first interface conversion unit which processes a first signal corresponding to a first format, and the second radio communication apparatus includes: a second interface conversion unit which is directly connected with the first interface conversion unit, and which is input with the first signal from the first interface conversion unit and a second signal corresponding to a second format, multiplexes the first signal and the second signal, and outputs; a third interface conversion unit which is input with multiplexed signal from the second interface conversion unit, extracts the first and second signal, and combines the extracted first and second signal; and a common amplifier which amplifies the first and second signals combined by the third interface conversion unit.

A radio communication method in a radio communication apparatus for performing radio communication, the method including: extracting multiplexed input first and second signal corresponding to two different formats respectively; combining the extracted first and second signal; amplifying the combined first and second signal with a common amplifier; and transmitting signal output from the common amplifier.

ADVANTAGEOUS EFFECT OF THE INVENTION

According to the present invention, a radio communication apparatus, a radio communication system and a radio communication method can be provided that enable two services to be accommodated smoothly. In addition, a radio communication apparatus and the like can be provided that is able to provide two services without increasing the number of optical cables. Moreover, a radio communication apparatus and the like can be provided that is compatible with multiple services.

BRIEF DESCRIPTION OF THE DRAWINGS

FIG. 5 is a drawing depicting another example of the configuration of a radio communication system;

FIG. 8 is a drawing depicting another example of the configuration of a radio base station;

FIG. 9 is a drawing depicting another example of the configuration of a radio base station.

Figure 1:
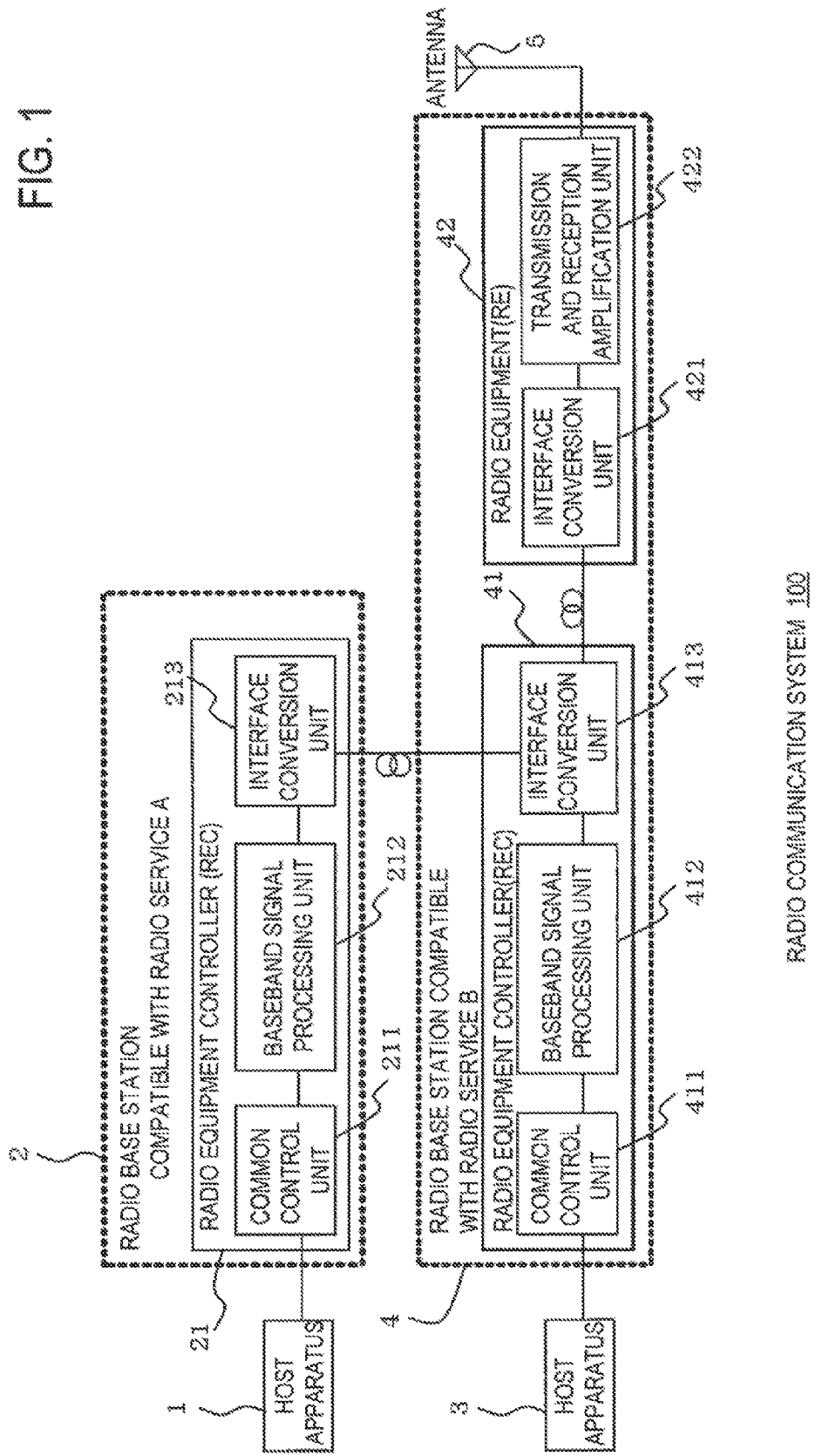
FIG. 1 is a drawing depicting an example of the configuration of a radio communication system.

EXPLANATION OF REFERENCE NUMERALS 1, 3 first, second host apparatus
2, 4 first, second radio base station
21, 41, 44 first, second, third radio equipment controller (REC)
42, 43, 44 second, third, fourth radio equipment (RE)
213, 413, 421, 431, 441 first, second, third, fourth, fifth interface conversion unit
422 reception amplification unit
2131, 4131, 4134, 4137, 4312, 4314, 4415, 4218 first, second, third, fourth, fifth, sixth, seventh, eighth CPRI processing unit
2132, 4132, 4133, 4136, 4138, 4211, 4311, 4313, 4416 first, second, third, fourth, fifth, sixth, seventh, eighth, ninth conversion unit
4135, 4212 first, second service multiplex separation unit
4213 frequency shift unit
4214 IQ extraction unit
4222 modulation unit
4225 down converter
4411, 4413, 4417 first, second, third time-frequency conversion unit
4414, 4419, 4420 first, second, third frequency-time conversion unit

BEST MODE FOR CARRYING OUT THE INVENTION

The following provides an explanation of embodiments of the present invention.

<First Embodiment>

First, an explanation is provided of a first embodiment. FIG. 1 is a drawing depicting an example of the configuration of a radio communication system 100. The radio communication system 100 includes a host apparatus 1 (to be referred to as a first host apparatus) which corresponds to a radio service A, a radio base station 2 (to be referred to as a first radio base station), a host apparatus 3 (to be referred to as a second host apparatus) which corresponds to a radio service B, a radio base station 4 (to be referred to as a second radio base station), and an antenna 5.

In addition, the first radio base station 2 includes a first radio equipment controller (REC) 21. The first radio equipment controller 21 includes a first common control unit 211, a first baseband signal processing unit 212, and a first interface conversion unit 213.

On the other hand, the second radio base station 4 includes a second radio equipment controller (REC) 41 and a second radio equipment (RE) 42. The second radio equipment controller 41 includes a second common control unit 411, a second baseband signal processing unit 412, and a second interface conversion unit 413. In addition, the second radio equipment 42 includes a third interface conversion unit 421 and a transmission and reception amplification unit 422.

The two host apparatuses 1 and 3 are, for example, radio network controllers (RNC) or access gateways (aGW), and transmit and receive data corresponding to each of two radio services (communication formats). Furthermore, in the embodiments indicated to follow, the radio service A is explained as an old service, while the radio service B is explained as a new service. Namely, in the case the radio base station 2 corresponding to the radio service A provides the radio service A via radio equipment not depicted and the antenna 5, an explanation is provided for the case in which radio services A and B are subsequently provided via the antenna 5 by installing the radio equipment controller 41 and the radio equipment 42 that are compatible with the radio service B in order to provide the new service. Furthermore, at that time, the connection line between the interface conversion unit 213 and radio equipment not depicted is used as a line for connecting the interface conversion unit 213 and the interface conversion unit 421 of the radio equipment 42, after which this line is reconnected as a line for connecting the interface conversion units 413 and 421, while a connection line that connects the interface conversion units 213 and 413 is newly added.

The first and second radio equipment controllers 211 and 411 control the radio base stations 2 and 4 by, for example, distributing synchronizing signals to each of the radio base stations 2 and 4, set individual settings and so forth.

The first and second baseband signal processing units 212 and 412 convert data from the host apparatuses 1 and 3 to baseband signals composed of I (in-phase) signals and Q (quadrature phase) signals, outputs them to the first interface conversion unit 213, and so forth.

The first through third interface conversion units 213, 413 and 421 convert to a signal format corresponding to the connection cables (such as CPRI), convert to baseband signals and so forth. The details of which are described later.

Although operation of the radio communication system 100 depicted in FIG. 1 will be described later, the effects thereof are described as follows. Namely, the second interface conversion unit 413 of the second radio equipment controller 41 multiplexes (or combines) two signals, consisting of signals corresponding to the radio service A from the first interface conversion unit 213 and signals corresponding to the radio service B from the second baseband signal processing unit 412, and outputs multiplexed signals, as an single signal, to the second radio equipment 42. In addition, the second interface conversion unit 413 separates signals from the third interface conversion unit 421 into two signals consisting of signal corresponding to the radio service A and signal corresponding to the radio service B, and outputs the signals to the first interface conversion unit 213 and the second baseband signal processing unit 412, respectively. Thus, the first radio base station 2 is not required to be installed the internal radio equipment (RE), and it is not necessary to additionally install an optical cable within the first radio equipment controller 21.

Figure 2:
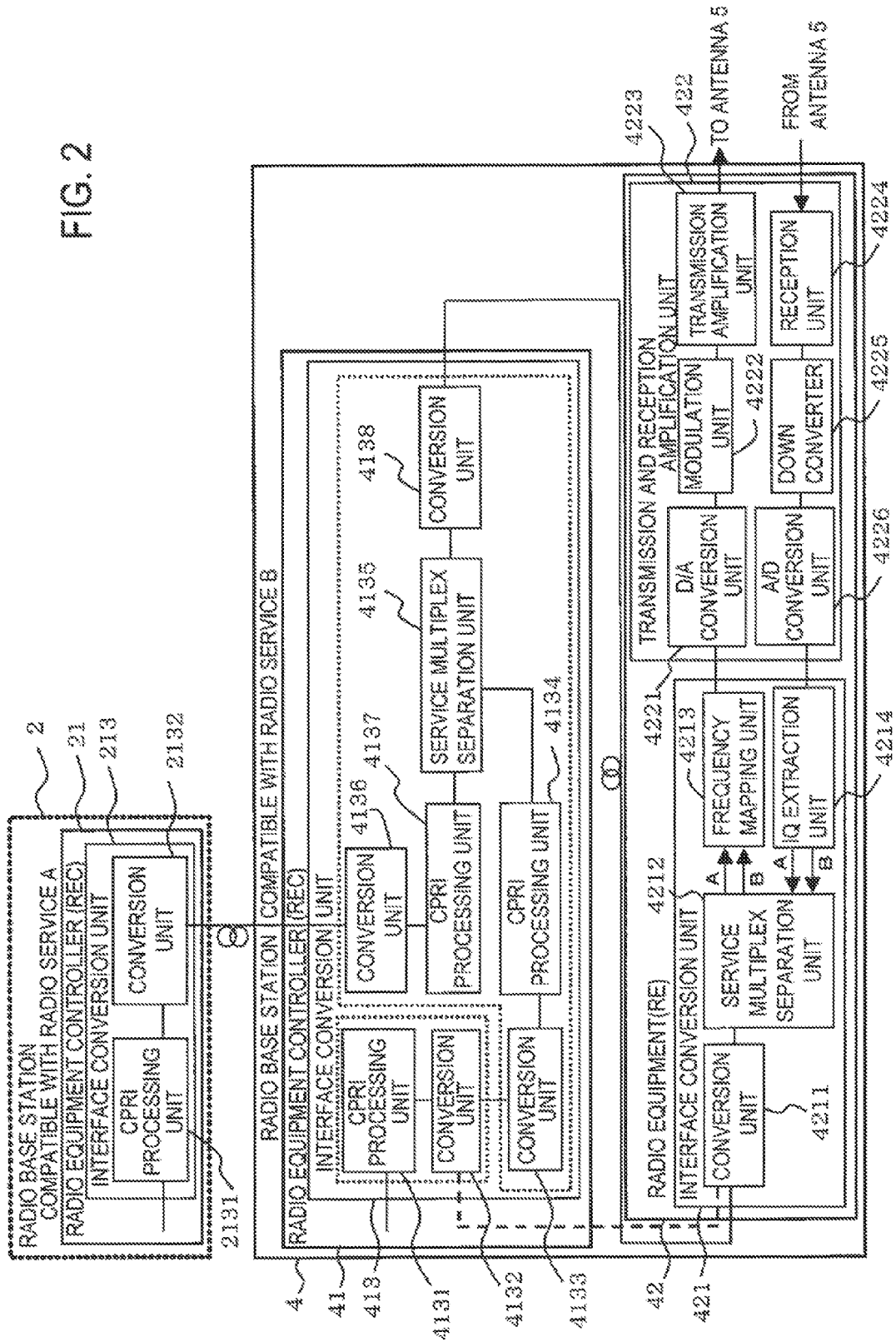
FIG. 2 is a drawing depicting an example of the configuration of a radio base station.

FIG. 2 is a drawing depicting an example of the detailed configuration of the first interface conversion unit 213, the second interface conversion unit 413, the third interface conversion unit 421, and the transmission and reception amplifier 422.

The first interface conversion unit 213 includes a first CPRI processing unit 2131 and a first conversion unit 2132.

In addition, the second interface conversion unit 413 includes a second CPRI processing unit 4131, a second conversion unit 4132, a third conversion unit 4133, a third CPRI processing unit 4134, a first service multiplex separation unit 4135, a fourth conversion unit 4136, a fourth CPRI processing unit 4137, and a fifth conversion unit 4138.

Moreover, the third interface conversion unit 421 includes a sixth conversion unit 4211, a second service multiplex separation unit 4212, a frequency shift unit 4213, and an IQ extraction unit 4214.

Moreover, the transmission and reception amplifier 422 includes a D/A conversion unit 4221, a modulation unit 4222, a transmission amplification unit 4223, a reception unit 4224, a down converter 4225, and an A/D conversion unit 4226.

The following provides an explanation of the operation of the radio base stations 2 and 4, containing the first through third interface units 213, 413 and 421, with reference to FIG. 1.

First, an explanation of the operation is provided while moving downlink (from the host apparatuses 1 and 3 towards the antenna 5). As depicted in FIG. 1, the first host apparatus 1 outputs data corresponding to the radio service A. This data is converted to baseband signal including the I signal and Q signal by the baseband signal processing unit 212 via the common control unit 211. The converted baseband signal is input to the first CPRI processing unit 2131 depicted in FIG. 2.

Figure 3:
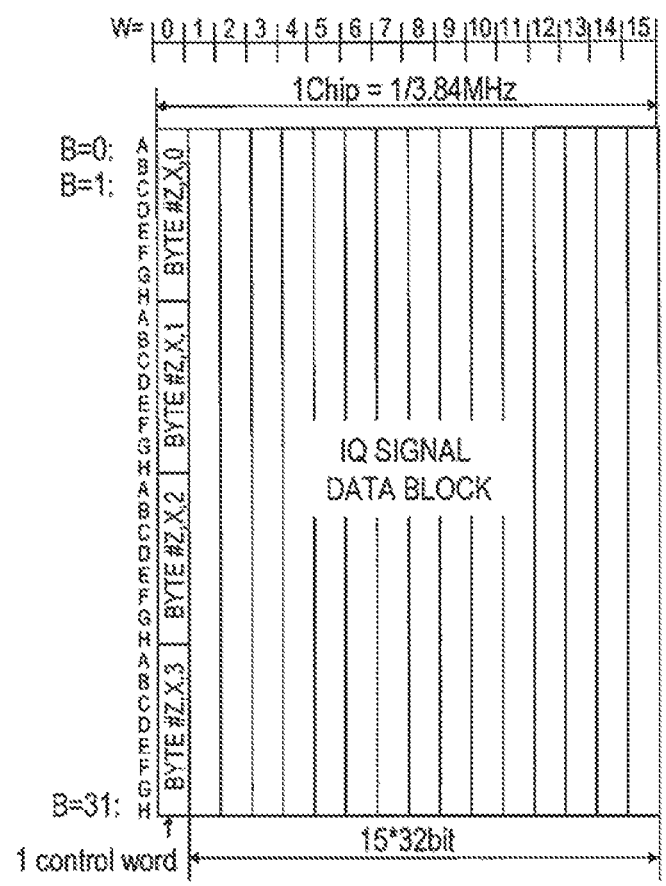
FIG. 3 is a drawing depicting an example of a transmission frame of a CPRI.

The first CPRI processing unit 2131 converts the baseband signal to signal of the CPRI format (to be referred to as CPRI signal). FIG. 3 depicts an example of a CPRI format, and the I signal and Q signal which are baseband signal are inserted into a data block region. The first conversion unit 2132 converts the CPRI signal to optical signal and transmits the optical signal to the second radio base station 4 via an optical cable.

The fourth conversion unit 4136 of the second interface conversion unit 413 converts optical signal from the first conversion unit 2132 to CPRI signal which is electrical signal and outputs CPRI signal. The fourth CPRI processing unit 4137 extracts I signal and Q signal on the basis of the CPRI signal from the fourth conversion unit 4136 and outputs them to the first service multiplex separation unit 4135.

On the other hand, data corresponding to the radio service B is output from the second host apparatus 3 depicted in FIG. 1, and the baseband signal corresponding to the radio service B is output via the second common control unit 411 and the second baseband signal processing unit 412. The baseband signal is then input to the second CPRI processing unit 4131 depicted in FIG. 2.

The second CPRI processing unit 4131 converts the baseband signal to CPRI signal (see, for example, FIG. 3) and outputs CPRI signal. The second conversion unit 4132 converts the converted CPRI signal to optical signal. The third conversion unit 4133 converts the converted optical signal so as to return them to CPRI signal, and the third CPRI processing unit 4134 extracts I signal and Q signal from the CPRI signal and outputs them to the first service multiplex separation unit 4135.

Here, the reason for CPRI signal being converted to optical signal by the second conversion unit 4132 is as follows. Namely, as indicated by the broken line in FIG. 2, the second conversion unit 4132 and the sixth conversion unit 4211 of the second radio equipment 42 can be connected by a cable such as an optical cable. As a result of this connection, the connection between the fifth conversion unit 4138 and the sixth conversion unit 4211 is severed, enabling only service corresponding to the radio service B to be provided. In other words, this connection is effective in cases in which a shared service is not to be provided. In order to realize this connection, for example, the second interface conversion unit 413 is configured so as to be able to be separated by providing the second CPRI processing unit 4131 and the second conversion unit 4132 on one board, while providing the third conversion unit 4133 to the fifth conversion unit 4138 on another board as indicated with the dotted lines. Furthermore, 4131 to 4133 can be omitted, and the input to 4131 can also be imparted to the CPRI processing unit 4134.

The first service multiplex separation unit 4135 multiplexes (or combines) I signal and Q signal in the form of baseband signal from the third CPRI processing unit 4134 and baseband signal corresponding to service A from the fourth CPRI processing unit 4137.

Figure 4A:
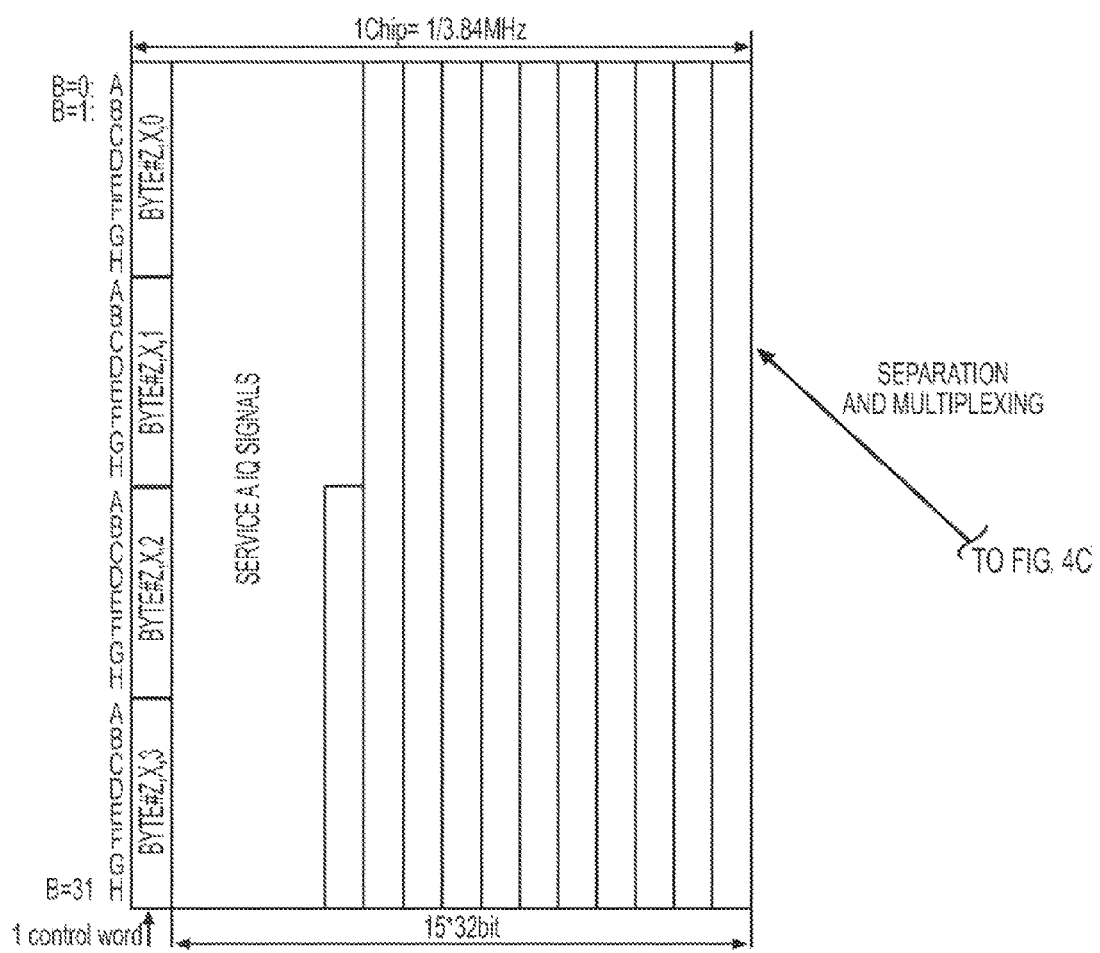
FIGS. 4(A) through 4(C) are drawings depicting examples of transmission frames of a CPRI.
Figure 4B:
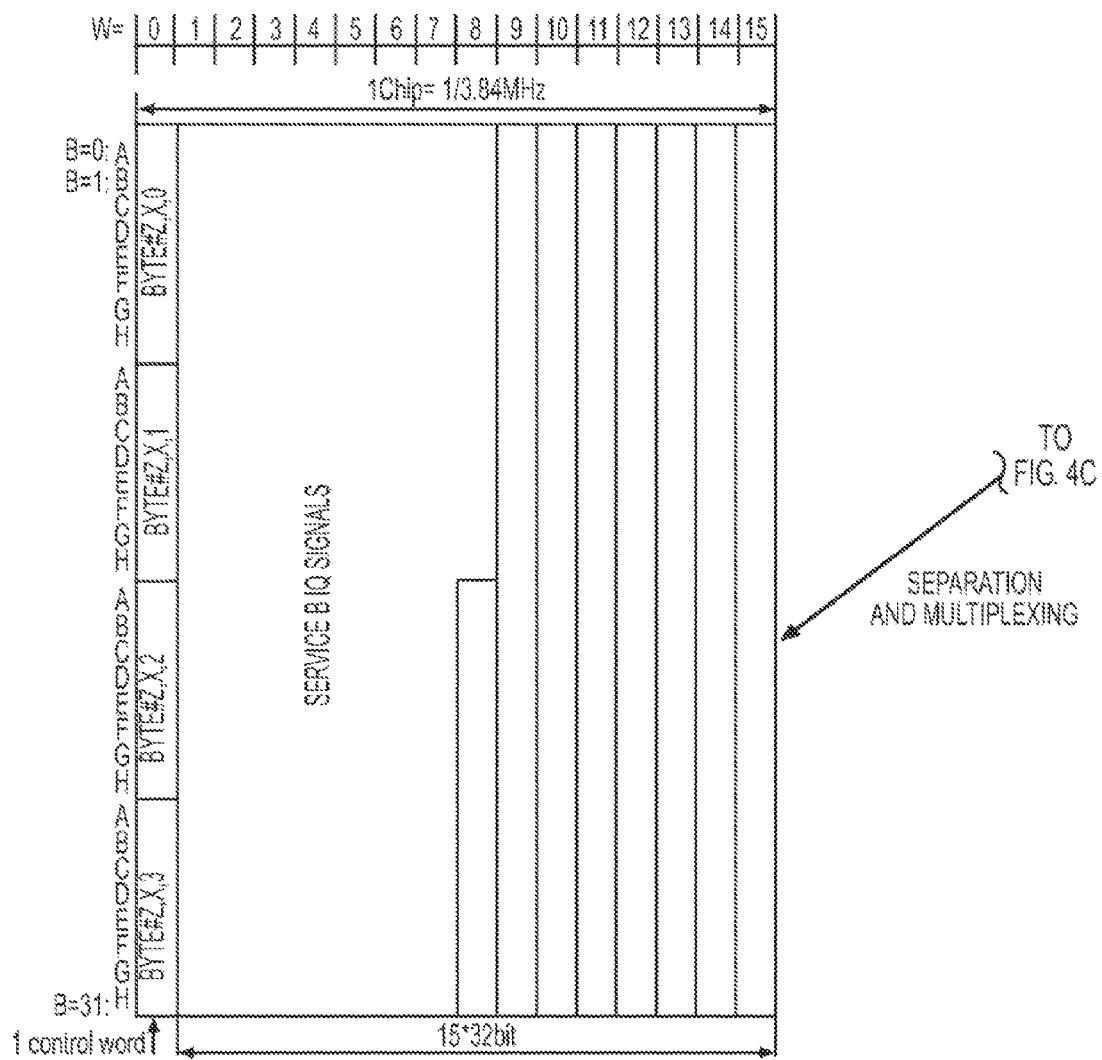
Figure 4C:
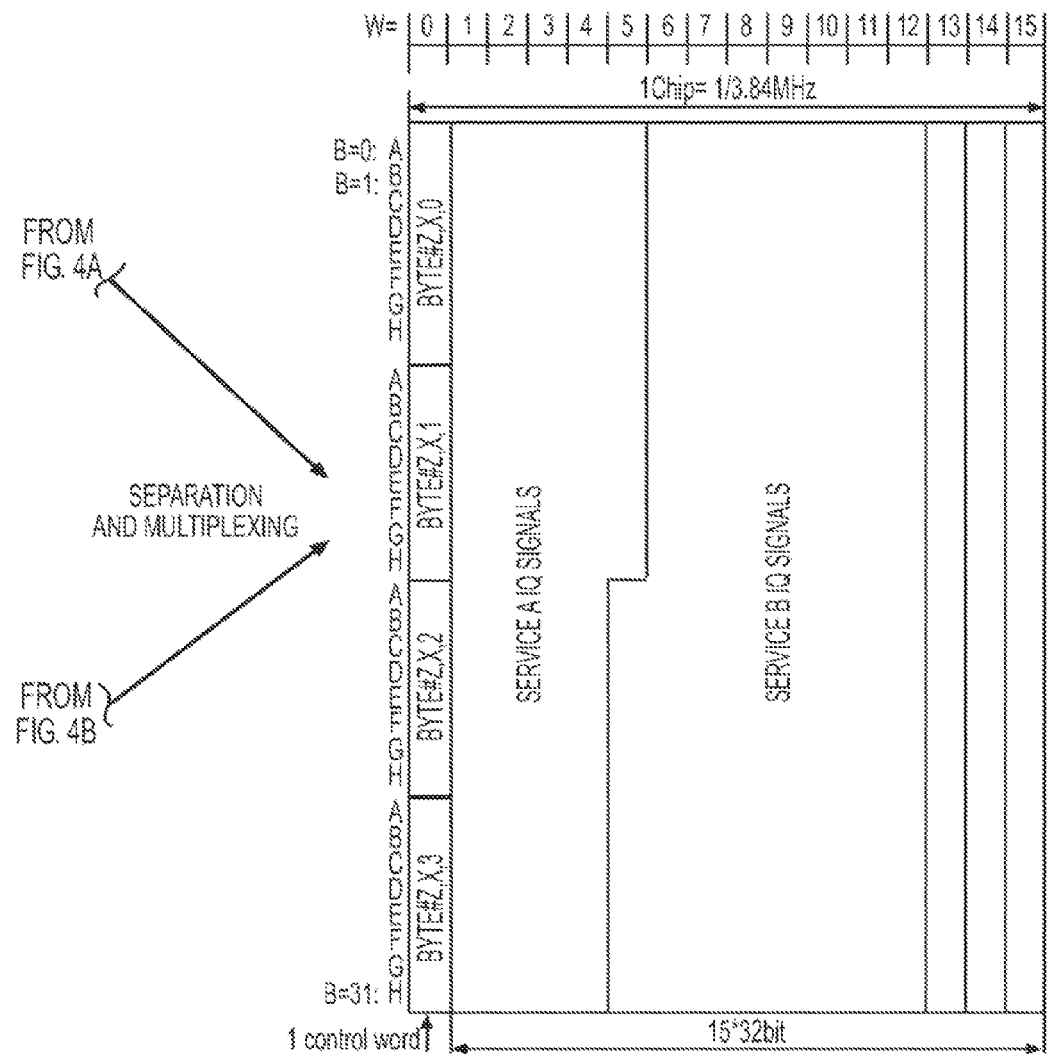

FIGS. 4(A) through 4(C) are drawings depicting examples of multiplexing processing. FIG. 4(A) depicts an example of CPRI signal into which is inserted I signal and Q signal of service A as an example of signals output from the fourth conversion unit 4136. In addition, FIG. 4(B) is an example of CPRI signal into which is inserted I signal and Q signal of service B as an example of signal output from the second CPRI processing unit 4131 or the third conversion unit 4133. The first service multiplex separation unit 4135 multiplexes by inserting I signal and Q signal of services A and B extracted with the third and fourth CPRI processing units 4134 and 4137 into their respective predetermined data block region (see FIG. 4(C)).

Returning to FIG. 2, the fifth conversion unit 4138 converts the multiplexed CPRI signal from the first service multiplex separation unit 4135 to optical signal. The converted optical signal is output to the third interface conversion unit 421 of the second radio equipment 42 via an optical cable.

The sixth conversion unit 4211 of the third interface conversion unit 421 converts the optical signal to CPRI signal of electric signal format. The second service multiplex separation unit 4212 extracts baseband signal of I signal and Q signal on the basis of the converted CPRI signal. As depicted in FIG. 4(C), since the CPRI signal is multiplexed, I signal and Q signal corresponding to service A and I signal and Q signal corresponding to service B are extracted, and the extracted I signals and Q signals of each service are output to the frequency shift unit 4213.

The frequency shift unit 4213 shifts the frequency of the respective I signals and Q signals corresponding to each service to a predetermined frequency band. At that time, the frequency bands are prevented from overlapping between services A and B. The digitally represented waveform signal for which frequency is shifted is output to the transmission and reception amplifier 422. Furthermore, signal input to the interface conversion unit 213 is, for example, digitally represented waveform signal which is generated by spread processing and filtering processing, while signal input to the interface conversion unit 4131 is, for example, digitally represented waveform signal which is generated by IFFT processing.

The D/A conversion unit 4221 converts the frequency-shifted baseband signal to analog signal. The modulation unit 4222 modulates to frequencies corresponding to each service (e.g., 2 GHz) by performing quadrature modulation to I signal and Q signal converted to analog signal.

The transmission amplification unit 4223 amplifies the modulated signals corresponding to the two services and outputs them to the antenna 5. The transmission amplification unit 4223 is a common amplifier capable of amplifying both signals corresponding to the two radio services A and B.

The antenna 5 transmits the amplified signals by radio communication to information terminal such as a mobile phone or a personal digital assistance (PDA). As a result, each radio service can be provided to user.

In this manner, the radio communication system 100 in this embodiment includes the second radio base station 4 as to enable the use of the transmission amplifier 4223 which is a common amplifier. Namely, the radio communication system 100 is configured so that signals corresponding to two radio services (communication formats) are time-multiplexed with the first service multiplex separation unit 4135, signals of two different services are respectively extracted by the second service multiplex separation unit 4212, and after being frequency-shifted by the frequency shifting unit 4213, are input to the common amplifier. Thus, the radio communication system 100 can be in a shared state that corresponds to two radio services. In addition, it is able to provide at least two radio services, since the radio communication system 100 performs processing by multiplexing signals corresponding to two radio services.

Next, an explanation of the operation is provided while moving uplink (direction in which signals are transmitted from the antenna 5 to the first radio base station 2).

Signal received by the antenna 5 is converted to fixed analog signal by the reception unit 4224, and is down-converted by the down converter 4225 to a frequency enabling input to the A/D conversion unit 4226 in a subsequent stage. The down-converted signal is converted to digital signal by the A/D conversion unit 4226 and output to the third interface conversion unit 421.

The IQ extraction unit 4214 extracts I signals and Q signals corresponding to each service from the digitally converted signal and outputs those signals.

The second service multiplex separation unit 4212 multiplexes these baseband signals, converts to CPRI signal by adding a header, and outputs. The CPRI signal in this case is signal as depicted in FIG. 4(C), for example. The sixth conversion unit 4211 converts the CPRI signal to optical signal and outputs.

The fifth conversion unit 4138 converts optical signal from the sixth conversion unit 4211 to CPRI signal which is electrical signal, and the CPRI signal is separated into baseband signals of each service by the first service multiplex separation unit 4135. Processing precisely corresponding to the reverse of the processing depicted in FIGS. 4(A) to 4(C) is performed. The baseband signal corresponding to the radio service A is output to the fourth CPRI processing unit 4137, while the baseband signal corresponding to the radio service B is output to the third CPRI processing unit 4134.

The baseband signal corresponding to the radio service A is converted to CPRI signal by the fourth CPRI processing unit 4137, and further converted to optical signal by the fourth conversion unit 4136. The optical signal is then converted to electrical signal by the first conversion unit 2132 connected by the cable, the electrical signal is converted to CPRI signal by the first CPRI processing unit 2131, and the CPRI signal is output to the baseband signal processing unit 212 depicted in FIG. 1. The baseband signal is extracted from the CPRI signal by the first baseband signal processing unit 212, and output to the first host apparatus 1 via the first common control unit 211.

On the other hand, the baseband signal corresponding to the radio service B is converted to CPRI signal by the third CPRI processing unit 4134, and the CPRI signal is converted to optical signal by the third conversion unit 4133. Subsequently, the baseband signal is extracted from the CPRI signal by the second conversion unit 4132 and the second CPRI processing unit 4131. The extracted baseband signal is output as is without performing any particular processing to the second baseband processing unit 412 depicted in FIG. 1, and then output to the second host apparatus 3 via the second common control unit 411.

<Second Embodiment>

The following provides an explanation of a second embodiment. FIG. 5 is a drawing depicting an example of the configuration of the radio communication system 100 in the second embodiment. The same reference numerals are used to indicate those portions of the radio communication system 100 of the second embodiment that are the same as those of the first embodiment.

The second radio base station 4 of the radio communication system 100 includes a third radio equipment (RE) 43. The third radio equipment 43 is connected with the first and second interface conversion units 213 and 413 via a cable, and can process the two communication formats of the first and second radio equipment controllers (REC) 21 and 41.

As depicted in FIG. 5, the configuration of the first radio base station 2 and the configuration of the second interface conversion unit 413 are the same as those of the first embodiment.

The second interface conversion unit 413 of the second radio base station 4 includes the second CPRI processing unit 4131 and the second conversion unit 4132.

The third radio equipment 43 of the second radio base station 4 includes a fourth interface conversion unit 431 and the transmission and reception amplification unit 422. In addition, the fourth interface conversion unit 431 includes a seventh conversion unit 4311, a fifth CPRI processing unit 4312, an eighth conversion unit 4313, a sixth CPRI processing unit 4314, the frequency shift unit 4213 and the IQ extraction unit 4214. The configuration of the transmission and reception amplification unit 422 is omitted from the explanation since it is the same as that of the first embodiment.

The operation of the principal portions of the radio communication system 100 configured in this manner is as described below. The first conversion unit 2132 of the first interface conversion unit 213 outputs optical signal corresponding to the radio service A. In addition, the second conversion unit 4132 of the second interface conversion unit 413 outputs optical signal corresponding to the radio service B.

The seventh conversion unit 4311 of the fourth interface conversion unit 431 converts optical signal corresponding to the radio service A to CPRI signal which is electrical signal, and the fifth CPRI processing unit 4312 extracts I signal and Q signal which is baseband signal from the converted CPRI signal.

The eighth conversion unit 4313 converts optical signal corresponding to the radio service B to CPRI signal which is electrical signal, and the sixth CPRI processing unit 4314 extracts I signal and Q signal which is baseband signal from the converted CPRI signal.

The frequency shift unit 4213 multiplexes signals of the radio services employing two communication formats in the same manner as the first embodiment. The frequencies of the signals of the two radio services are shifted to prescribed frequency bands. At that time, the frequency bands are prevented from overlapping. An explanation of subsequent signal processing is omitted since it is the same as that of the first embodiment.

Operation of the uplink direction is as follows. Namely, baseband signals of each service corresponding to the two communication formats in the I/Q extraction unit 4214 are output to the fifth and sixth CPRI processing units 4312 and 4314, and are respectively converted to each CPRI signal. The CPRI signals are then converted to optical signals by the seventh and eighth conversion units 4311 and 4313, after which they are output to the first and second radio equipment controllers 21 and 42, respectively.

As depicted in FIG. 5, the radio communication system 100 of the second embodiment eliminates the need for providing separate radio equipment corresponding to the first radio equipment controller 21, thereby eliminating the need to intentionally securing space for installing the radio equipment. The radio communication system 100 effects obtained in the first embodiment since it operates in the same manner as the first embodiment with the exception of that described above.

<Third Embodiment>

The following provides an explanation of a third embodiment. The third embodiment is an example of implementing two communication formats in the same manner as the first embodiment by combining and separating signals corresponding to two communication formats on a frequency axis.

Figure 6:
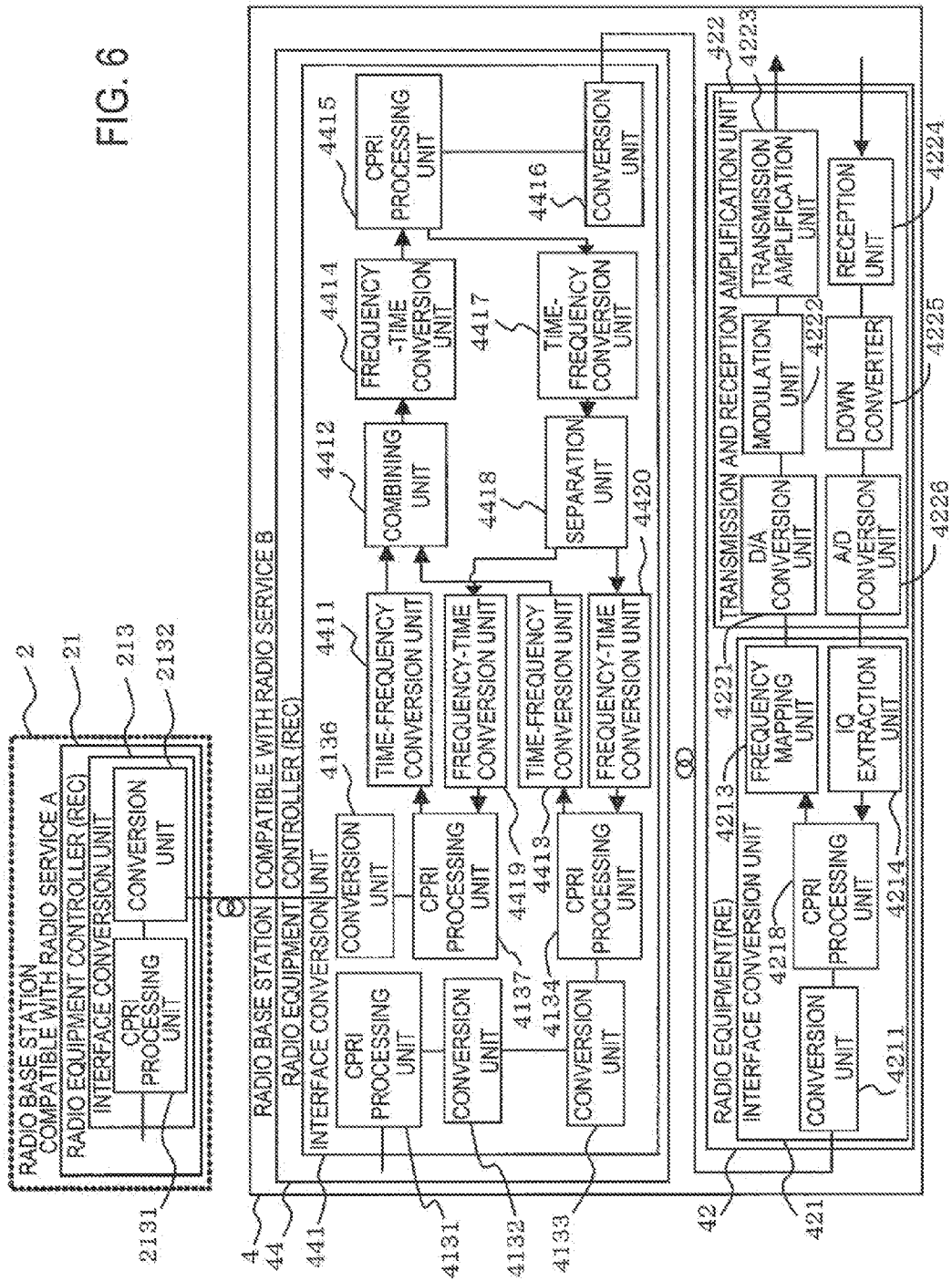
FIG. 6 is a drawing depicting another example of the configuration of a radio base station.

FIG. 6 is an example of the configuration of principal portions of the radio communication system 100 of the third embodiment. The same reference numerals are used to indicate those portions of the radio communication system 100 of the third embodiment that are the same as those of the first embodiment.

In comparison with the first embodiment, the second radio base station 4 includes a third radio equipment controller (REC) 44, and the third radio equipment controller 44 includes a fifth interface conversion unit 441.

The fifth interface conversion unit 441, includes, in addition to the second through fourth CPRI processing units 4131, 4134 and 4137 and the second through fourth conversion units 4136, a first time-frequency conversion unit 4411, a combining unit 4412, a second time-frequency conversion unit 4413, a first frequency-time conversion unit 4414, a seventh CPRI processing unit 4415, a ninth conversion unit 4416, a third time-frequency conversion unit 4417, a separation unit 4418, and second and third frequency-time conversion units 4419 and 4420. Furthermore, 4131, 4132 and 4133 are the same as previously described with respect to being able to be omitted.

The following provides an explanation of downlink operation. Namely, signal corresponding to the radio service A is input from the first radio base station 2 to the fourth conversion unit 4136, and converted from optical signal to CPRI signal which is electrical signal. The fourth CPRI processing unit 4137 extracts I signal and Q signal which is baseband signal from the converted CPRI signal and outputs. The first time-frequency conversion unit 4411 converts I signal and Q signal on a time axis to I signal and Q signal a frequency axis by a Fourier transform and the like and outputs.

On the other hand, signal corresponding to the radio service B is output to the second time-frequency conversion unit 4413 via the second CPRI processing unit 4131, the second conversion unit 4132, the third conversion unit 4133, and the third CPRI processing unit 4134. The second time-frequency conversion unit 4413 converts I signal and Q signal on the time axis to I signal and Q signal on the frequency axis by the Fourier transform and the like in the same manner as the first time-frequency conversion unit 4411.

The combining unit 4412 inputs I signal and Q signal on the frequency axis corresponding to the radio services A and B, and combines signals by adding the two signals on the frequency axis on the frequency axis.

The first frequency-time conversion unit 4414 again converts the combined signals from the combining unit 4412 to I signal and Q signal on the time axis by a reverse Fourier transform and the like. It goes without saying that the converted signal is a signal combined from signals corresponding to the two radio services.

Figure 7A:
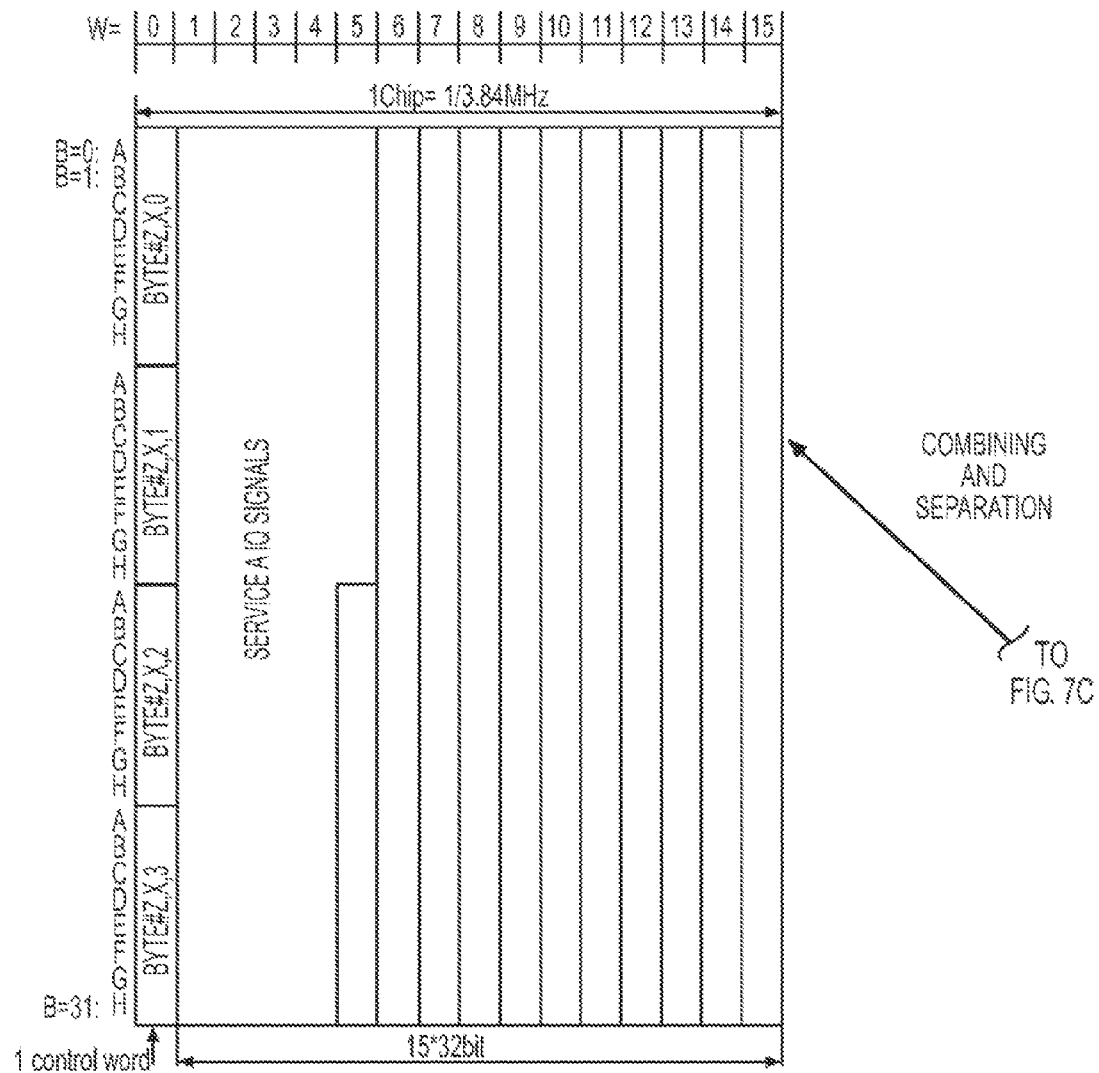
FIGS. 7(A) through 7(C) are drawings depicting examples of transmission frames of a CPRI.
Figure 7B:
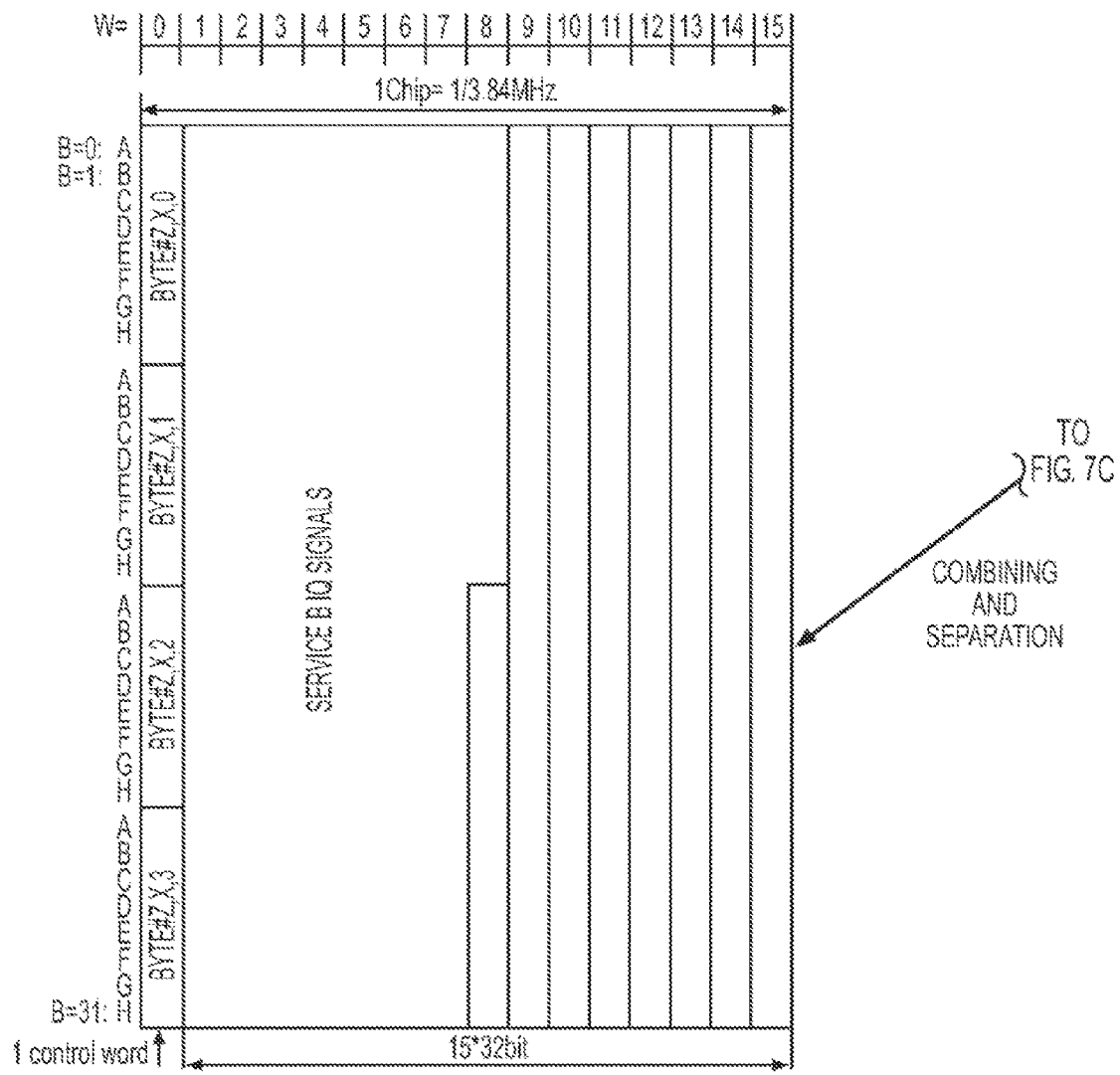
Figure 7C:
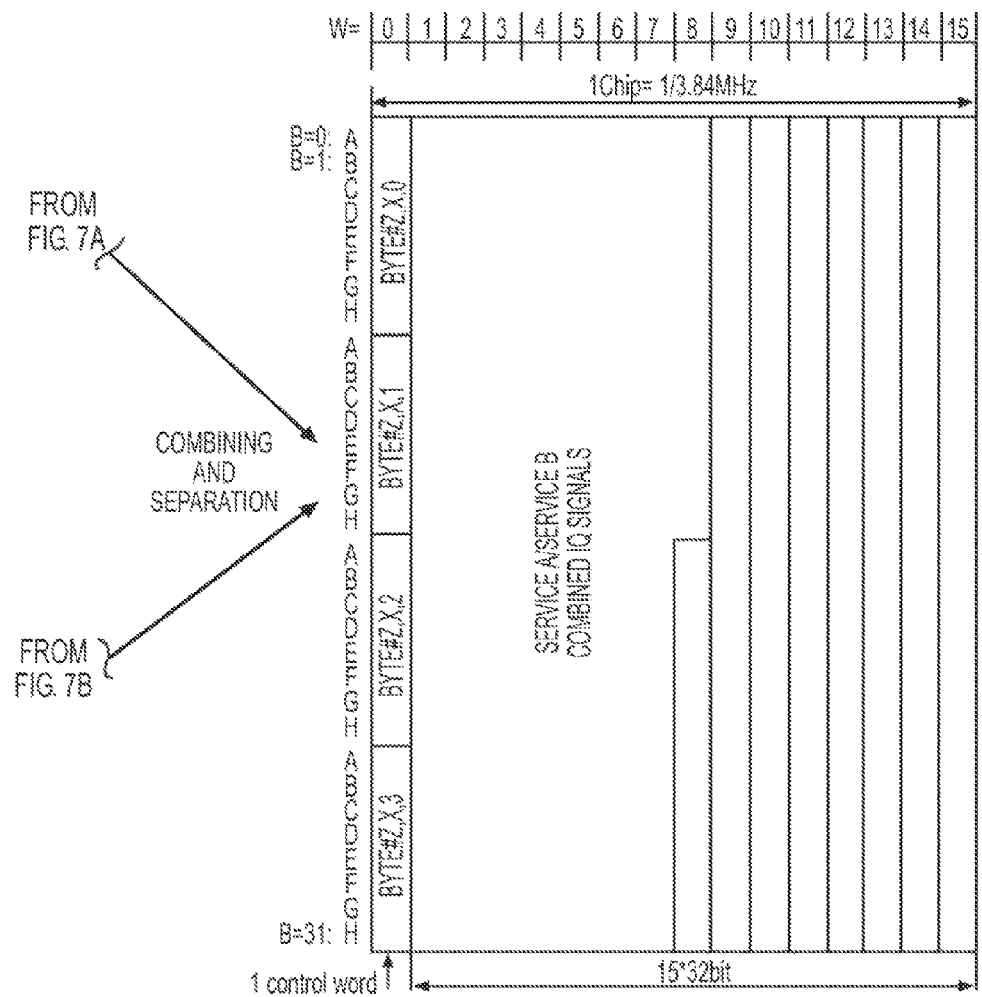
Figure 10:
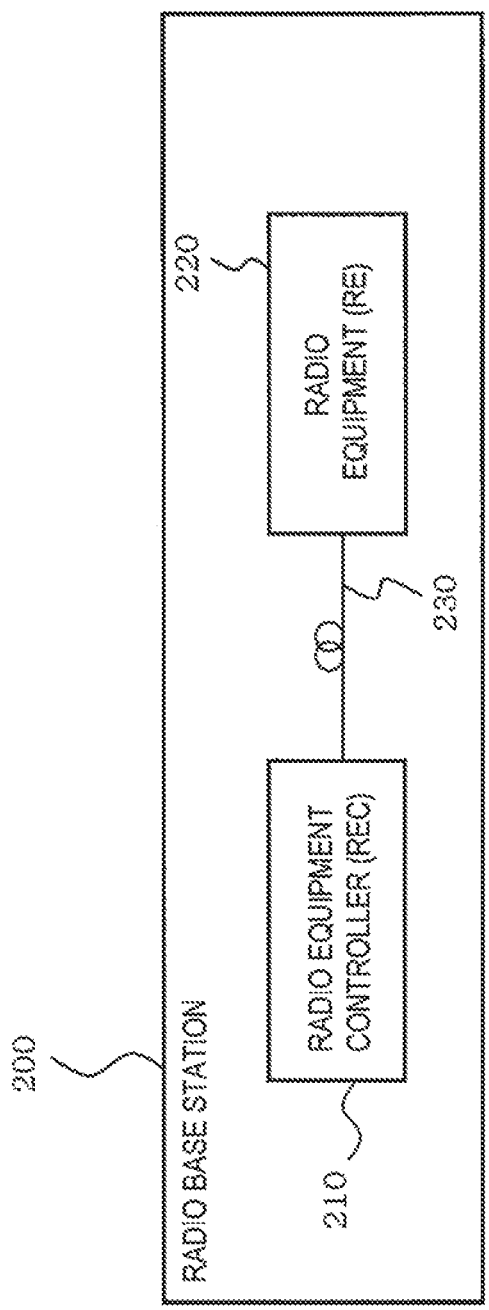
FIG. 10 is a drawing depicting an example of the configuration of a radio base station of the prior art.

The converted I signal and Q signal on the time axis is converted to CPRI signal by the seventh CPRI processing unit 4415. FIG. 7(C) is a drawing depicting an example of the format of CPRI signal following conversion. As depicted in this drawing, two signal combined on the frequency axis is inserted into the data block region. Furthermore, FIG. 7(A) depicts an example of the format of CPRI signal output from the fourth CPRI processing unit 4137, while FIG. 7(B) depicts an example of the format of CPRI signal output from the third CPRI processing unit 4134.

Subsequently, the CPRI signal is converted to optical signal by the ninth conversion unit 4416 and output to the second radio equipment 42.

The sixth conversion unit 4211 of the third interface conversion unit 421 converts the optical signal to CPRI signal which is electric signal. The eighth CPRI processing unit 4218 extracts base band signal which is I signal and Q signal, from the converted CPRI signal. As depicted in FIG. 7(C), since the CPRI signals are already combined, the I signal and Q signal with which the service A and B is combined is extracted, and the extracted I signal and Q signal are output to a frequency mapping unit 4213.

The frequency mapping unit 4213 maps the extracted I signal and Q signal to a predetermined frequency band. The mapped baseband signal is then output to the transmission and reception amplification unit 422.

An explanation of subsequent processing is omitted since it is the same as that of the first embodiment.

Operation of the uplink direction is as follows.

Although signal received with the antenna 5 is processed in the transmission and reception amplification unit 422, an explanation thereof is omitted since processing in the transmission and reception amplification unit 422 is the same as that of the first embodiment.

The IQ extraction unit 4214 extracts I signal and Q signal from digitally converted signal and outputs. The extracted I signal and Q signal are in a state of combining the services A and B.

The eighth CPRI processing unit 4218 converts the baseband signal to CPRI signal by, for example, adding a header and the like thereto, and outputs the CPRI signals. The CPRI signal in this case is signal like those depicted in FIG. 7(C), for example. The sixth conversion unit 4211 converts the CPRI signal to optical signal and outputs.

Signal from the second radio equipment 42 is output to the third time-frequency conversion unit 4417 via the ninth conversion unit 4416 and the seventh CPRI processing unit 4415.

The third time-frequency conversion unit 4417 converts I signal and Q signal which is baseband signal from the seventh CPRI processing unit 4415 to I signal and Q signal on the frequency axis by the Fourier transform and the like.

The separation unit 4418 separates I signal and Q signal on the frequency axis into I signals and Q signals of each radio service. For example, the I signal and Q signal corresponding to the radio service A are separated according to a certain predetermined frequency band, while the I signal and Q signal corresponding to the radio service B are separated according to another predetermined frequency band. The I signal and Q signal corresponding to the radio service A are output to the second frequency-time conversion unit 4419, while the I signal and Q signal corresponding to the radio service B are output to the third frequency-time conversion unit 4420.

The second frequency-time conversion unit 4419 converts the I signal and Q signal on the frequency axis to I signal and Q signal on the time axis by the Fourier transform and the like and then outputs. The converted I signal and Q signal are output to the first radio base station 2 via the fourth CPRI processing unit 4137 and the fourth conversion unit 4136.

In addition, the third frequency-time conversion unit 4420 also converts the I signal and Q signal on the frequency axis to I signal and Q signal on the time axis and outputs, the signals are output from the fifth interface conversion unit 441 to the baseband signal processing unit 412 (see FIG. 1). An explanation of subsequent processing is omitted since it is the same as that of the first embodiment.

In this third embodiment as well, since processing is performed by combining signals of two communication formats by deploying and adding the signals on the frequency axis, the radio communication system 100 can be made to be corresponded with two radio communication services in the same manner as the first embodiment.

Furthermore, in this embodiment as well, the second conversion unit 4132 and the sixth conversion unit 4211 can be directly connected with the cable, thereby making it possible to implement one service only.

<Fourth Embodiment>

Next, an explanation is provided of a fourth embodiment. FIG. 8 is a drawing depicting an example of the configuration of the principal portions of the radio communication system 100 in the fourth embodiment. The fourth embodiment is an example in which the first radio equipment controller 21 corresponding to the radio service A and the second radio equipment 42 capable of processing two communication formats are connected directly without going through the second interface conversion unit 413 of the second radio equipment controller 41 that processes a communication format corresponding to the radio service B.

In this fourth embodiment, since a configuration is employed that does not go through the second radio equipment controller 41, when switching from the old second radio equipment controller 41 to a new second radio equipment controller, the new second radio equipment controller can be smoothly installed in the second radio base station 4 while providing one of the radio services.

The configuration is the same as that of the first embodiment with the exception of the first conversion unit 2132 and the sixth conversion unit 4211 being connected, and the second radio equipment controller 41 no longer being required. With respect to processing, the second service multiplex separation unit 4212 does not performs multiplex processing or separation processing, but rather directly outputs input CPRI signal to the frequency shift unit 4213, and outputs the I signal and Q signal which is input baseband signal directly to the sixth conversion unit 4211. An explanation of subsequent processing is omitted since it is the same as that of the first embodiment.

<Fifth Embodiment>

The following provides an explanation of a fifth embodiment.

FIG. 9 is a drawing depicting an example of the configuration of principal portions of the radio communication system 100 in the fifth embodiment. The same reference numerals are used to indicate those portions of the fifth embodiment that are the same as those of the first embodiment. Although the second interface conversion unit 413 corresponding to the radio service B has multiplex and separation function in the first embodiment, the first interface conversion unit 213 corresponding to the radio service A has multiplex and separation functions in this embodiment.

As depicted in FIG. 9, the second interface conversion unit 413 included in the second radio equipment controller 41 of the second radio base station 4 includes the second CPRI processing unit 4131 and the second conversion unit 4132.

On the other hand, the first interface conversion unit 213 included in the first radio equipment controller 21 of the first radio base station 2 includes the third and fourth CPRI processing units 4134 and 4137, the third and fourth conversion units 4133 and 4136, the first service multiplex separation unit 4135 and the fifth conversion unit 4138 in addition to the first CPRI processing unit 2131 and the first conversion unit 2132.

Signal corresponding to the radio service A can be output to the first interface conversion unit 213 by connecting the fourth conversion unit 4136 and the second conversion unit 4132 with an optical cable, and the two multiplexed signals can be transmitted from the second radio equipment 42 by connecting the fifth conversion unit 4138 and the sixth conversion unit 4211.

Similar to the first embodiment, CPRI signal corresponding to radio services A and B is multiplexed in the first multiplex separation unit 4135. For example, the CPRI signal is multiplexed by mapping to the prescribed region of the data block of the CPRI format as depicted in FIG. 4(C).

In this manner, multiplex and separation functions of two radio services can be performed in not only one interface conversion unit, but also by another interface conversion unit in this embodiment. Furthermore, since processing is performed in this embodiment in the same manner as the first embodiment with the exception of multiplex and separation processing being performed by the first interface conversion unit 213, the same effects are demonstrated as those of the first embodiment.

<Other Embodiments>

The following provides an explanation of other embodiments. Although connection of the first conversion unit 2132 and the fourth conversion unit 4136 with the optical cable is explained in the first and third embodiments (see FIGS. 2 and 6), they may be connected with a cable other than the optical cable. In addition, the fourth conversion unit 4316 and the second conversion unit 4132 in the fifth embodiment may also be connected with a cable other than the optical cable.

In addition, in the fifth embodiment, processing for multiplexing and separating signal in the direction of the time axis is performed in the first service multiplex separation unit 4135 of the first interface conversion unit 213 of the first radio base station 2 corresponding to the radio service A. However, combining processing on the frequency axis as explained in the third embodiment may be performed in the first interface conversion unit 213 instead of the first service multiplex separation unit 4135.

The invention claimed:

1. A radio apparatus connectable to a radio control apparatus via a communication link, the radio apparatus comprising:
an extractor configured to extract a frequency combined baseband signal combined by a first signal of a first frequency bandwidth corresponding to a first communication format and a second signal of a second frequency bandwidth corresponding to a second communication format, from a reception signal received by an antenna;
a first time-frequency converter configured to convert an I signal and a Q signal of the first signal on a time axis to a first I signal and Q signal on a frequency axis;

a second time-frequency converter configured to convert an I signal and a Q signal of the second signal on a time axis to a second I signal and Q signal on a frequency axis; and a transmitter configured to transmit the extracted and converted I signals and Q signals of the frequency combined baseband signal to the radio control apparatus via the communication link.

2. The radio apparatus according to claim 1, wherein the first communication format is W-CDMA (Wideband Code Division Multiple Access), and the second communication format is LTE (Long Term Evolution).

3. A radio control apparatus connectable to a radio apparatus via a communication link, the radio control apparatus comprising:

a receiver configured to receive a frequency combined baseband signal combined by a first signal of a first frequency bandwidth corresponding to a first communication format and a second signal of a second frequency bandwidth corresponding to a second communication format, from the radio apparatus via the communication link;

a first time-frequency converter configured to convert an I signal and a Q signal of the first signal on a time axis to a first I signal and Q signal on a frequency axis;

a second time-frequency converter configured to convert an I signal and a Q signal of the second signal on a time axis to a second I signal and Q signal on a frequency axis; and a separator configured to separate an I signal and a Q signal of the first frequency bandwidth corresponding to the first communication format and an I signal and a Q signal of the second frequency bandwidth corresponding to the second communication format, outputs the separated first signal element to a first processing unit configured to perform a process according to the first communication format, and output the separated second signal element to a second processing unit configured to perform a process according to the second communication format.

4. The radio control apparatus according to claim 3, wherein the first communication format is W-CDMA (Wideband Code Division Multiple Access), and the second communication format is LTE (Long Term Evolution).

5. A radio communication method in a radio apparatus connectable to a radio control apparatus via a communication link, the method comprising:

extracting a frequency combined baseband signal combined by a first signal of a first frequency bandwidth corresponding to a first communication format and a second signal of a second frequency bandwidth corresponding to a second communication format, from a reception signal received by an antenna, by an extraction unit;

converting an I signal and a Q signal of the first signal on a time axis to a first I signal and Q signal on a frequency axis, by a first time-frequency converter;

converting an I signal and a Q signal of the second signal on a time axis to a second I signal and Q signal on a frequency axis, by a second time-frequency converter; and transmitting the extracted and converted I signals and Q signals of the frequency combined baseband signal to the radio control apparatus via the communication link, by a transmission unit.

6. The radio communication method according to claim 5, wherein the first communication format is W-CDMA (Wideband Code Division Multiple Access), and the second communication format is LTE (Long Term Evolution).

* * * * *